United States Patent [19]

Koyama et al.

[11] 4,078,638
[45] Mar. 14, 1978

[54] OIL PRESSURE SHOCK ABSORBER

[75] Inventors: Kiyosaburo Koyama; Hitoshi Okayasu, both of Gyoda, Japan

[73] Assignee: Showa Manufacturing Co., Ltd., Tokyo, Japan

[21] Appl. No.: 757,031

[22] Filed: Jan. 5, 1977

[30] Foreign Application Priority Data

Sep. 30, 1976 Japan .................................. 51-116589
Nov. 16, 1976 Japan .................................. 51-136849

[51] Int. Cl.² ................................................ F16F 9/48
[52] U.S. Cl. ............................... 188/288; 188/297; 188/314; 267/64 R; 267/116; 293/DIG. 2
[58] Field of Search ............... 188/284, 287, 314, 288, 188/297, 316, 286; 267/64 R, 116, 139; 293/DIG. 2, 70

[56] References Cited

U.S. PATENT DOCUMENTS

| 3,491,993 | 1/1970 | Scholin et al. | 267/64 R X |
| 3,788,433 | 1/1974 | Katsumori | 188/314 |
| 3,804,217 | 4/1974 | Keijzer et al. | 188/322 |
| 3,870,130 | 3/1975 | Millar | 188/314 |
| 3,904,182 | 9/1975 | Allinquant et al. | 188/314 X |
| 3,944,198 | 3/1976 | Sakamoto | 188/288 X |

FOREIGN PATENT DOCUMENTS

| 1,069,537 | 2/1954 | France | 188/314 |
| 1,109,968 | 6/1961 | Germany | 188/100 |
| 2,166,749 | 6/1975 | Germany | 188/287 |

*Primary Examiner*—George E. A. Halvosa
*Attorney, Agent, or Firm*—A. W. Breiner

[57] ABSTRACT

An oil pressure shock absorber which can be disassembled wherein an inner cylinder having a free piston fitted in it and a high pressure gas enclosed on the base end side is slidably fitted at the tip inside an outer cylinder, an oil seal is provided on their sliding contact surfaces, a plurality of orifices arranged in the axial direction are formed on the side wall of the inner cylinder inserted in the outer cylinder, an annular concave groove is formed on the inside surface of the outer cylinder so as to be opposed to the above mentioned orifices, axial concave grooves are made on the outside surface of the inner cylinder from its tip and the tip part of the inner cylinder and the interior of the outer cylinder are filled with oil, thereby a collision energy may be uniformly absorbed over the entire range of the stroke.

3 Claims, 6 Drawing Figures

OIL PRESSURE SHOCK ABSORBER

BACKGROUND OF THE INVENTION

1. Field of the Invention

This invention relates to oil pressure shock absorbers and more particularly to an oil pressure shock absorber for absorbing a collision energy which is easy to make and assemble and is to be used to fit a bumper to an automobile.

2. Description of the Prior Art

Such oil pressure shock absorber can most effectively reduce shocks by uniformly absorbing a collision energy over the entire range of the stroke. However, as the operating velocity of the shock absorber is highest in the initial period of a collision and becomes zero in the end period, in order to obtain a uniform attenuating force over the entire range of the stroke from the initial period to the end period of the collision, it is necessary to gradually increase the oil flow resistance. Therefore, in the prior art, there has been taken such means as of gradually varying the depth of the oil flowing groove in the axial direction. However, such shock absorber has been complicated in the structure and very troublesome to make. Moreover, the prior shock absorber is difficult to be assembled and when it is once assembled, it is impossible to be disassembled and repaired, thus providing an uneconomical result.

SUMMARY OF THE INVENTION

Therefore, an object of the present invention is to provide an oil pressure shock absorber which can uniformly absorb a collision energy over the entire range of the stroke with a simple structure easy to manufacture.

Another object of the present invention is to provide an oil pressure shock absorber which can be disassembled.

According to the present invention, an oil pressure shock absorber comprises an outer cylinder fixed at the base end to a car body, an inner cylinder slidably fitted in the tip part in the outer cylinder and having a bracket at the base end and a free piston fitted in the inner cylinder, the inner cylinder has a plurality of orifices arranged in the axial direction on the side wall thereof and is provided with concave grooves in the axial direction from the tip on the outside surface thereof, the outer cylinder has an annular concave groove formed on the inside surface thereof so as to be opposed to the orifices, a high pressure gas is enclosed between the free piston and the base of the inner cylinder and the space between the free piston and the tip of the inner cylinder and the interior of the outer cylinder are filled with oil.

DETAILED DESCRIPTION OF PREFERRED EMBODIMENTS

Figure 1:
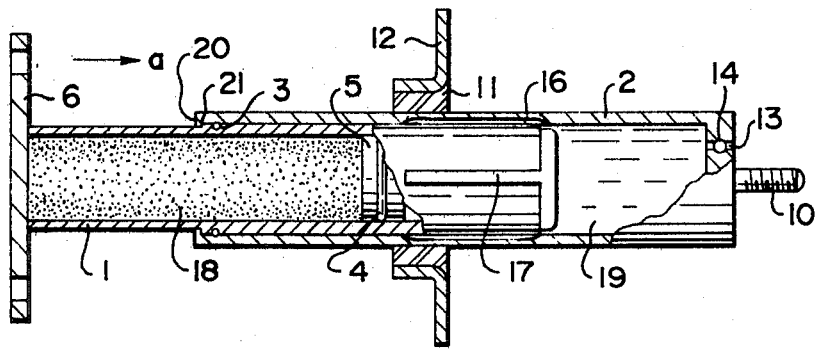
FIG. 1 is a vertically sectional view showing an oil pressure shock absorber embodying the present invention.

An inner cylinder 1 is slidably fitted in the tip part inside an outer cylinder 2, is provided with an oil-sealing O-ring 3 in its sliding contact part, has a free piston 5 having on O-ring 4 fitted on the inside and a bracket 6 for fitting, for example, a bumper of an automobile formed at the base end and is closed at the tip with a bottom plate 7 provided with an orifice 8. A snap ring 9 is fitted on the inside surface of the inner cylinder so as to be a stopper for the free piston 5. A screw 10 for fixing to an automobile body or the like is provided to project in the axial direction at the base end of the outer cylinder 2. Further, a supporting plate 12 is provided through a rubber ring 11 in a proper position outside the outer cylinder 2. An oil inlet hole 13 is provided at the base end of the outer cylinder 2 and is closed with a ball 14. Further, the outer cylinder 2 is calked inward at the tip so as to engage with a step part provided on the outer periphery of the inner cylinder 1 and to prevent said inner cylinder from escaping out of the outer cylinder. A plurality of orifices 15 aligned in the axial direction are provided in the tip part of such inner cylinder 1 as is described above. Such annular concave groove 16 as is opposed to the above mentioned orifices is formed on the inside surface of the outer cylinder 2. A plurality of axial concave grooves 17 reaching a proper position from the tip are provided on the outside surface of the inner cylinder. A high pressure gas 18 is enclosed between the free piston 5 in the inner cylinder 1 and the base end of the inner cylinder 1. The space between the free piston 5 and the tip part of the inner cylinder 1 and the interior of the outer cylinder 2 are filled with oil so that no gap may be made.

Figure 2:
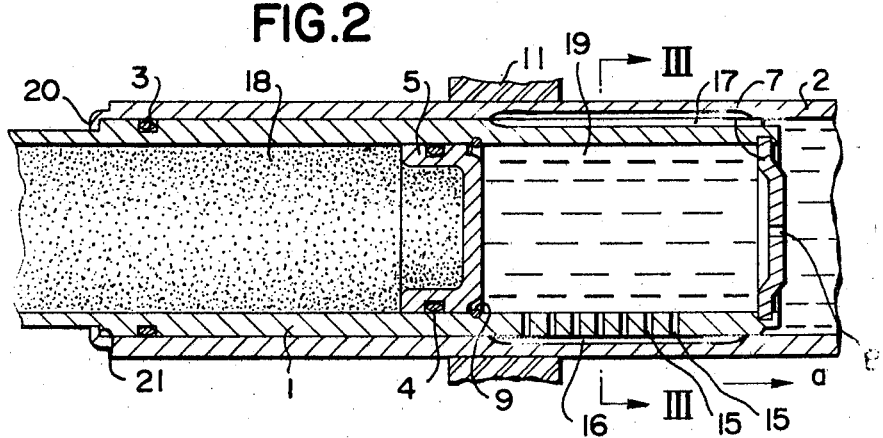
FIG. 2 is a vertically sectional enlarged view of FIG. 1.
Figure 3:
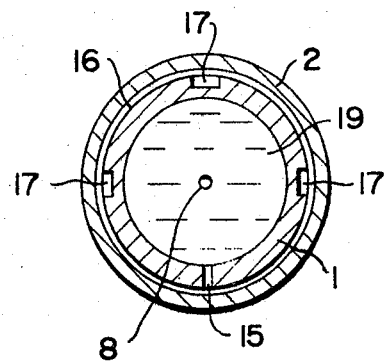
FIG. 3 is a sectional view taken along line III—III in FIG. 2.

In the above described oil pressure shock absorber, normally, by the pressure of the gas 18, the inner cylinder 1 will be moved leftward in FIGS. 1 and 2 so that the step part of the inner cylinder may be pressed in contact with the calked part 20 of the tip of the outer cylinder.

Figure 4:
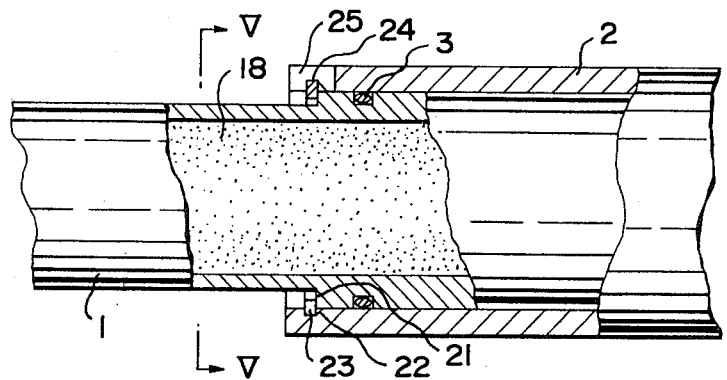
FIG. 4 is a vertically sectional enlarged view of another embodiment of stopper mechanism.
Figure 5:
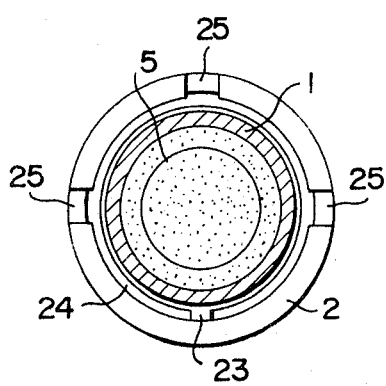
FIG. 5 is a sectional view on line V—V in FIG. 4.
Figure 6:
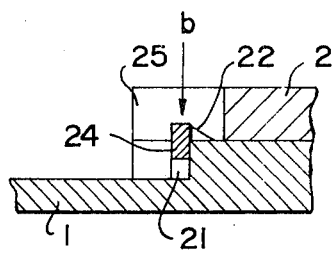
FIG. 6 is an enlarged view of a part of the embodiment shown in FIG. 4.

According to the present invention, other than the stopper mechanism having such the structure as above mentioned the embodiment shown in FIGS. 4 to 6 can be used. In this embodiment the outer cylinder 2 is provided on the inner surface of its opening part with an annular concave groove 22 and a snap ring 24 having a cut-out portion 23 is fitted in the concave groove 22. The snap ring 24 is urged to be in contact with a step portion 21 formed on the outer surface of the inner cylinder 1, thereby preventing the inner cylinder from escaping from the outer cylinder 2 by the pressure of a gas 18. Further, a plurality of axial cut-out grooves 25 (three grooves are shown in FIG. 5) having a proper width and arranged in such a spaced relation as of an angle of 90° are formed at an extreme end of the outer cylinder 2, the bottom end of the grooves of which being extended to the position where the concave groove 22 is formed. Thus, the above described embodiment of the stopper mechanism of the present invention is provided with the snap ring fitted in the end of the outer cylinder in the oil pressure shock absorber for absorbing a collision energy and a plurality of the cut-out grooves 25 formed at the extreme end of the outer cylinder.

That is to say, when assembling, the inner cylinder 1 is pressed into the outer cylinder 2 and the snap ring 24 which is compressed to make its diameter small, is inserted from the opening end of the outer cylinder 2 so as to be fitted in the concave groove 22. On the other hand, when disassembling, the snap ring 24 is pressed, as shown by an arrow *b* in FIG. 6, from three directions (in case of the embodiment shown in the drawings) by, for example, a screw driver or other similar tool, the tip of which being inserted in the cut-out groove 25 so that the snap ring may be compressed to make its diameter small, with this operation the snap ring 24 can be disengaged from the concave groove 22 and then the inner cylinder 1 is pushed from the outer cylinder 2 by the pressure of the gas 18 so that the former may be separated from the latter.

Now, referring to the embodiments shown in FIGS. 1 to 6, when such shock as is indicated by the arrow *a* is applied to a bumper or the like fitted to the bracket 6, the gas 18 will be compressed and the inner cylinder 1 will move in the direction indicated by the above mentioned arrow. Therefore, pressed by the bottom plate 7 of the inner cylinder 1, the oil within the outer cylinder 2 will flow into the inner cylinder 1 through the orifice 8 and also through the axial concave grooves 17 formed on the outside surface of the inner cylinder, the annular concave groove 16 on the inside surface of the outer cylinder and the orifices 15. However, when the inner cylinder 1 moves in the direction indicated by the arrow *a*, some of the above mentioned orifices 15 will come out of the range opposed to the annular concave groove 16 and will be closed with the inside surface of the outer cylinder 2. That is to say, with the increase of the moving distance of the inner cylinder 1, the orifices 15 will be closed in turn from the right end and therefore the oil flow resistance will gradually increase. At the same time, with the increase of the moving distance of the inner cylinder, due to the absorption of the collision energy, the moving velocity of the inner cylinder will gradually reduce. Therefore, the attenuating force generated by the passage of the oil through the above mentioned orifices will be kept substantially constant irrespective of the moving position of the inner cylinder and the collision energy will be able to be substantially uniformly absorbed over the entire range of the stoke of the inner cylinder.

As described above, in the shock absorber according to the present invention, as the collision energy can be substantially uniformly absorbed over the entire range of the compression stroke, if the stoke is made constant, the shock will be able to be very effectively reduced.

Further, only the annular concave groove is provided on the inside surface of the outer cylinder and the axial concave grooves and the plurality of orifices are provided in the inner cylinder but such complicated structure as a supporting pillar provided with a piston or many orifices or oil flowing concave grooves and set at the center is not required and therefore this shock absorber is easy to manufacture, assemble and disassemble. Therefore, when an oil seal is damaged or some parts are damaged by the collision of the automobile, the repair can be easily made.

I claim:

1. An oil pressure shock absorber comprising an outer cylinder fixed at the base end thereof to a car body, an inner cylinder having a closed end and an axial orifice through said closed end, slidably fitted in the tip part thereof in said outer cylinder and having a bracket at the base end thereof and a free piston fitted in said inner cylinder, a stopper means formed at the tip of said outer cylinder and a step part provided on the outside surface of said inner cylinder so as to be able to engage with said stopper means, said inner cylinder having a plurality of orifices arranged in the axial direction through the side wall thereof and being provided wth concave grooves in the axial direction from the tip on the outside surface, thereof said outer cylinder having an annular concave groove formed on the inside surface so as to be opposed to said orifices, a high pressure gas being enclosed between said free piston and the base end of said inner cylinder and the space between said free piston and the tip of said inner cylinder and the interior of the outer cylinder being filled with oil, wherein an oil seal is provided on the sliding contact surface of said inner cylinder with said outer cylinder.

2. The oil pressure shock absorber according to claim 1 wherein the stopper means consisting of an annular concave groove formed on the inside surface of an end of said outer cylinder, a snap ring fitted in said concave groove and being urged to be in close contact with the stepped portion formed on the outer surface of said inner cylinder and a plurality of axial cut-out grooves provided at an extreme end of said outer cylinder, the bottom of said grooves extending to said annular concave groove, is provided.

3. The oil pressure shock absorber according to claim 1 wherein said free piston is held on the inside surface of said inner cylinder by a snap ring.

* * * * *